United States Patent [19]

Tauscher

[11] 4,114,832

[45] Sep. 19, 1978

[54] CARTRIDGE FOR TAPE-, RIBBON-, OR FILAMENT-LIKE INFORMATION STORAGE MEDIA

[76] Inventor: Wolfgang G. Tauscher, Wilh.-Meister-Str.3, D-638 Bad Homburg, Fed. Rep. of Germany

[21] Appl. No.: 750,823

[22] Filed: Dec. 15, 1976

[30] Foreign Application Priority Data

Dec. 17, 1975 [DE] Fed. Rep. of Germany ....... 2556872

[51] Int. Cl.² .................... G03B 1/04; G11B 15/32
[52] U.S. Cl. ................................ 242/194; 352/156
[58] Field of Search ............... 242/193, 194, 197–200; 352/72–78 R, 156; 360/130, 132

[56] References Cited

U.S. PATENT DOCUMENTS

| 2,996,264 | 8/1961 | Bygdnes | 242/193 |
| 3,252,669 | 5/1966 | Geri | 242/194 |
| 3,716,205 | 2/1973 | Geuder | 242/194 |
| 3,848,265 | 11/1974 | Biery et al. | 360/132 |

*Primary Examiner*—Leonard D. Christian
*Attorney, Agent, or Firm*—Bucknam and Archer

[57] ABSTRACT

A cartridge for an information carrier (4) comprises a housing (1), openings in the housing for access to the information carrier, flaps (6,6a) covering the opening, a shaft (2) fastened to the housing, and two reels (3,3a) rotating around the shaft, with the information carrier being guided between the two reels. The cartridge comprises at least a spring differential compensating drive with two spring mechanisms of constant torque (10,10a) which continuously create oppositely directed torques to hold the information carrier in continuous tension. Each spring mechanism comprises a supply roll (9,9a), a working roll (8,8a) and a pre-bent spring tape (10,10a). The working rolls rotate around shaft (2) and are connected to the reels. The rolls of the spring mechanisms are mounted onto the reels and the supply rolls of the springs are arranged on a common support (7) which is loosely rotatable with the working rolls and the reels about the shaft. The flaps have also the function of gripping arms for the tensioned information carrier. They have a depression (13) and a hook (14) in the apparatus is engageable with the depression.

9 Claims, 4 Drawing Figures

CARTRIDGE FOR TAPE-, RIBBON-, OR FILAMENT-LIKE INFORMATION STORAGE MEDIA

This invention relates to information storage systems and more specifically to a cartridge for at least one tape or filament type information carrier guided from a supply reel to a take-up reel. The reels have a spring differential compensating drive inside the hollow hubs which continuously creates oppositely directed torques at the reels and which serves the purpose of always maintaining the information carrier under tension with longitudinal traction, even when the cartridge is not positioned in the apparatus which is used for the recordal and transmission. The spring differential consists of a spring mechanism of constant torque having at least one pre-bent roll spring band which is coiled in an S-shape, counter to its inherent pre-curvature and which is wound between a supply roll and a working roll, with the rolls belonging to the spring mechanism being rotatably arranged on the reel shaft. The cartridge has a housing which is provided with openings for access to the information carrier, the openings being covered by flaps. This type of biased spring is known as Negator spring. It is wound in its biased sense onto a supply roll and counter its bias sense onto a working roll.

Cartridges of this type are used for information processing, for storage, particularly with magnetic tapes, picture films, and also with punch tapes and ink ribbons in typewriters and printing machines.

In modern cartridges of this type, a length of the information carrier, for instance a tape, is pulled out of the cartridge housing and is inserted in the guide path of the apparatus, for the purpose of achieving high recording quality. For this purpose, openings in the cartridge housing are necessary, which, however, expose the information carrier to possible deterioration due to the action of harmful environmental conditions. For reliable protection the cartridges are either kept in additional protective containers or the openings present in the housing are covered by flaps or shutters provided thereon. However, additional devices are required in the respective apparatuses for the purpose of opening and closing the flaps and shutters and pulling out and reinserting the information carrier, after completion of the information processing operation devices which complicate the construction, increase the cost and reduce the safety of operation.

Another disadvantage of these cartridges and apparatuses is the relatively long down time between the time of insertion of the cartridge and the time when the apparatus is ready for operation and also between the end of operation and ejection of the cartridge. In the known systems, all the steps of inserting and positioning the cartridge in the apparatus, keeping the information carrier under tension between the reels by means of the rewind drive of the apparatus, pulling out the information carrier from the cartridge and the insertion of the information carrier in the guide and transport path of the apparatus must be carried out in a definite time sequence. The same operations must be executed in the reverse time sequence after the information processing operation is completed. This sequence in time is unavoidable with the known apparatuses and known procedures because the information carrier can be reliably pulled out of the cartridge housing and above all be brought back into the cartridge housing in an orderly fashion only if it is kept under tension. For the purpose of tensioning the information carrier, however, first the rewind drive of the apparatus must be put in operation and to achieve this, the cartridge must first have been inserted in the apparatus, it must have been brought in the proper position and any existing cover, flaps or shutters must have been opened. It is obvious that these known procedures result in down time during which the processing equipment is not available for the actual information processing operation and this considerably slows down the work progress and greatly increases the operating costs, particularly in automated systems.

Several proposals are indeed known to obviate this problem. According to German application No. 1,920,902 (U.S. Ser. No. 28,313 filed Apr. 14, 1970 and now abandoned) the information carrier in the cartridge is continously kept under tension even when the cartridge is outside the apparatus. According to this proposal, however, the housing openings for access to the cartridge are not covered by flaps or shutters, nor is the information carrier pulled out of the cartridge for insertion in the apparatus. For the purpose of providing the information carrier with constant tension, a roll spring differential compensating drive is used which is so arranged in the hollow hubs of the two coaxially arranged tape reels that oppositely directed torques are continuously generated at these reels which always keep the tape under tension. Other proposals of this type are known according to which the reels with the tensioning means are not installed in the cartridge housing. These proposals are described in U.S. Pat. Nos. 3,552,685 and 3,252,669.

These known proposals with roll spring differential can be classified into three different groups:
1. Only one roll spring is associated with both reels jointly as described in German Pat. No. 19 209 02.
2. Two roll springs are associated with both reels jointly as described in U.S. Pat. No. 2,996,264.
3. Each reel has its own roll spring associated to it (see German Pat. No. 19 902 02; U.S. Ser. No. 28,312 filed Apr. 14, 1970 now abandoned).

If one roll spring is associated with both reels jointly, as in the first group, the effective torque between the reels corresponds to the torque of the spring. The number of the differential compensating revolutions corresponds to the number of spring winding layers on the working roll, with possible transmission ratio. This is described in U.S. Pat. No. 3,252,669 and German Pat. No. 19 209 02.

The major disadvantage of this type of proposals resides in the eccentric arrangement of the roll spring and the resulting strong imbalance, which continuously varies in amount and therefore cannot be compensated by equalizing weights. This imbalance manifests itself particularly during rapid rewinding in vibrations which are disturbing.

If two roll springs are associated with both reels jointly, as in the second group, the imbalance can be avoided by symmetrical arrangement of the springs. The torque effective at the reels is equal to that of the sum of both springs. The available compensating revolutions, however, correspond only to the number of spring windings of one spring on its working roll. All roll springs are wound one over the other on the same working roll.

The disadvantage of this group of proposals resides in the very great space requirement of the spring arrangement. Therefore, only relatively few compensating revolutions are available, so that only short information carriers can be wound.

In the third group of proposals of this type, each reel has its own roll spring associated with it. The effective torque at the reels equals the torque of each of the springs. The number of available compensation revolutions between the reels is equal to the sum of the windings of both roll springs on their working rolls. Each spring is wound on its own working roll.

This arrangement of the roll springs has the advantage that it results in a much higher number of available compensating revolutions as compared with the other two groups, but the imbalance due to eccentric arrangement of the roll springs on their supply rolls manifests itself very disturbingly at the reels.

If one assumes equal structural volume, the ratios between the proposals of groups 1, 2 and 3 are:
according to the available compensating revolutions: 1 : 0.4 : 1.6;
according to the rewindable information carrier length, 1 : 0.3 : 4.

It should be noted that all three groups of proposals have in common the additional disadvantage that the roll springs with their supply rolls are arranged on the reels themselves and eccentrically to the axis of rotation. The springs, therefore, greatly increase the moment of inertia of the rotating parts of the assembly. When the steps of starting or stopping are carried out rapidly, in particular with information carriers rewound about half way, uncontrollably high energy impulses may be transmitted to the information carrier with the result that the information carrier may be destroyed or distorted.

According to another proposal which is also close to the present invention, described in Japanese Pat. No. 481 48-73, the information carrier is protected by a flap and is lifted out of the cartridge by means of a gripper. Further, for the purpose of reinserting the information carrier in an orderly fashion after the cartridge is closed, a loop catcher is provided which is actuated on the side of the apparatus and which becomes operative only during extraction and re-insertion. While the tape is running, the loop catcher is rendered inoperative. This device, however, cannot be used for the tensioning of the information carrier because it is limited only to endless tape cartridges and with these cartridges, the informaton carrier coil must always be loose, so that the layers in the coil may always easily slide past each other during operation so as to work their way through to the core of the reel. If the loop catcher tensioned the information carrier, one would have to fear a concentration of the outer layers of tape and consquently the running of the tape would be blocked.

One object of this invention is to provide a cartridge for at least one tape or filament type information carrier, in which the information carrier is kept continuously under tension and in which no disturbing imbalance occurs during rewinding.

Another object is to provide a cartridge which is closed on all sides outside the running mechanism, and in which the information carrier is lifted out of the cartridge housing during insertion into the apparatus when the information carrier is placed in the guide path of the apparatus.

Still another object is to provide a cartridge which avoids down time, that is time not available for information processing between insertion of the cartridge and the time when the apparatus is ready for operation, as well as between the end of operation and the ejection of the cartridge.

One advantage of the cartridge according to the invention is that it may contain very long information carriers and that it permits short start/stop time. Another advantage is that it may be manufactured at low cost, and is equally suitable for simple manually operable systems as well as for automated systems.

The crux of the present invention resides in the fact that each reel has its own roll spring connected with it, specifically each respective working roll is coaxially connected with a reel, and that the supply rolls of the roll springs are arranged on a common support which is loosely rotatable with the working rolls and the reels about a common main axle shaft. The spring differential compensating drive comprises two counteracting constant torque spring mechanisms, each comprising at least one biased spring band, (Negator spring) wound in its bias direction onto a spring supply roll and counter its bias direction in S-like shape, onto a spring working roll, wherein each working roll is mounted coaxially onto one of the reels. Further, in the cartridge according to the invention at least one gripping arm for the tensioned information carrier is pivotably arranged in the cartridge housing. Another feature of the cartridge of this invention is that the gripping arm has a depression to which is associated on the side of the apparatus a hook which engages in this depression during insertion of the cartridge. When the hook engages in the depression, it pivots the gripping arm with the tensioned information carrier out of the housing, and when the cartridge is retracted out of the apparatus, it pushes the gripping arm with the tensioned information carrier back into the cartridge. Still another feature is that the cartridge is provided with devices for driving on the side of the apparatus and for fixation of the spools against undesired rotation when the cartridge is closed.

With reference to the drawings, FIGS. 1-4, they illustrate a preferred embodiment of the invention and specifically a cartridge for a magnetic tape. This cartridge has two gripping arms for lifting out the information carrier which is always kept under tension. These gripping arms at the same time serve as cover flaps of the housing openings of the cartridge.

Figure 1:
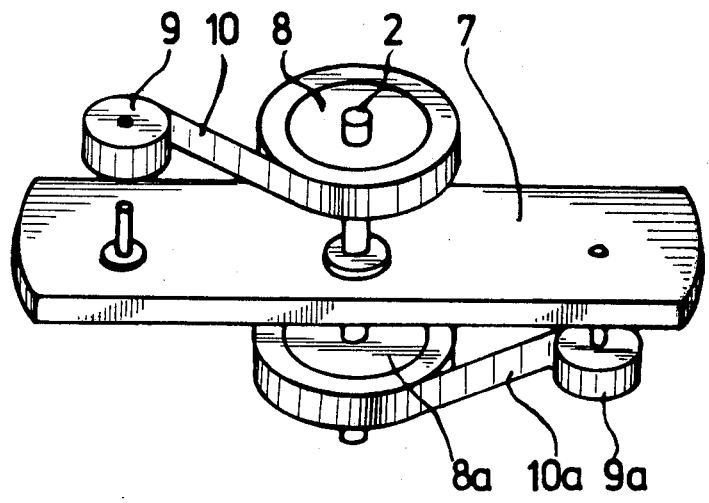
FIG. 1 is an exploded view in perspective of the roll spring differential compensating drive.
Figure 2:
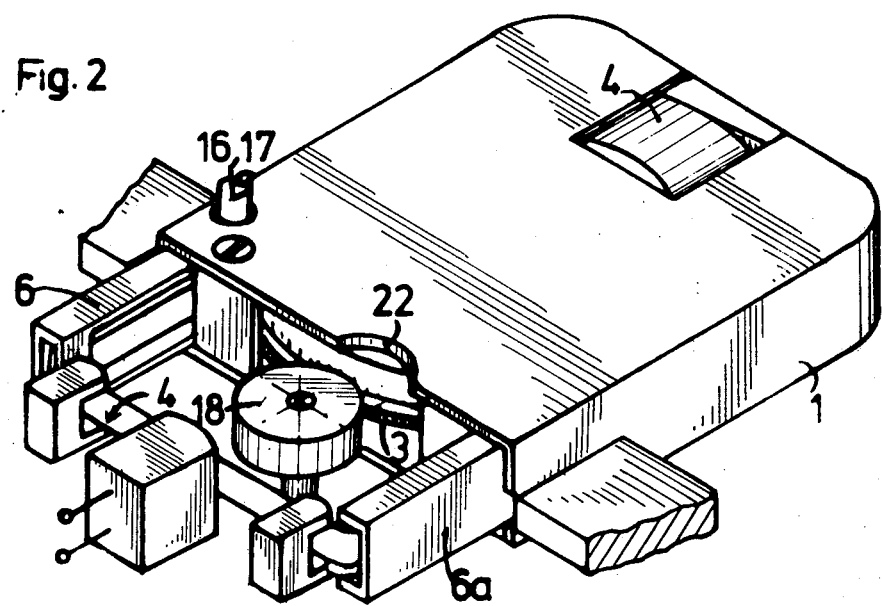
FIG. 2 is a view in perspective of the opened cartridge engaged with the apparatus.
Figure 3:
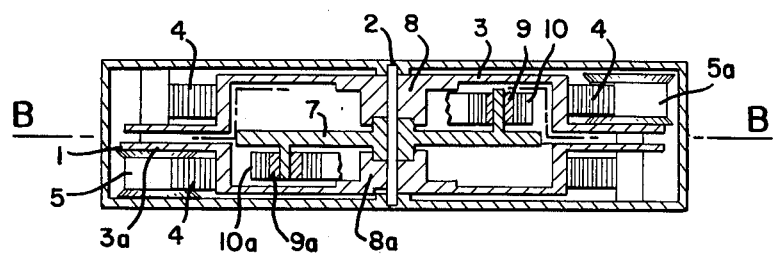
FIG. 3 is a transverse section along line A—A through the magnetic tape cartridge with the magnetic tape rewound half way.
Figure 4:
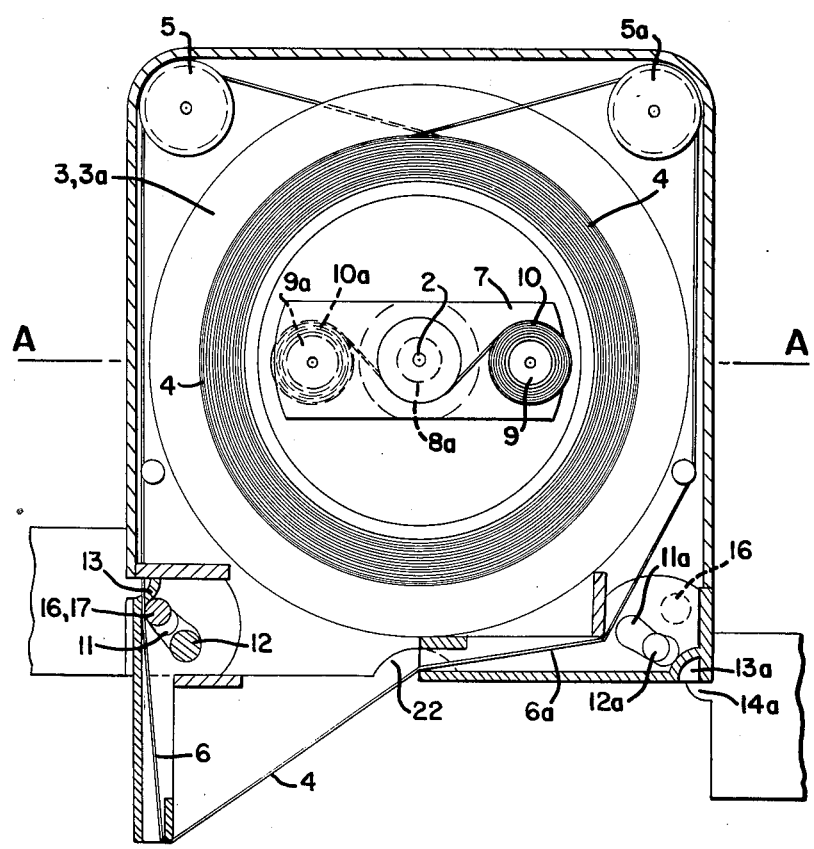
FIG. 4 is a longitudinal section along line B—B through the magnetic tape cartridge with one open and one closed gripping arm being engaged with the apparatus.

In the cartridge housing 1 is fastened the main shaft 2, about which the two reels 3 and 3a loosely rotate coaxially. A magnetic tape 4 is guided between the reels 3 over the deflection rolls 5 and 5a, as well as over the gripping arms 6 and 6a which are in the form of flaps, and is fastened on the reels. The magnetic tape is held in permanent tension by the roll spring differential compensating drive illustrated in FIG. 1. This compensating drive consists of the support plate 7, which is loosely rotatable in the hollow reel hubs on the main shaft 2. It also comprises the two working rolls 8 and 8a, which rotate around the same shaft 2, between the reels 3 and the support 7 respectively, and which in the example shown are a part of the reels 3 themselves and further the two supply rolls 9 and 9a, which are arranged with their axis parallel to the main shaft 2 on plate 7. Plate 7 is loosely rotatable in such a way that one working roll 8 and one supply roll 9 are present on one plane of rotation at any time.

Between each of the pairs of working rolls and supply rolls 8, 9, a pre-bent spring ribbon 10, 10a is coiled in an S shape, counter to the inherent pre-curvature, in such a way that the twist direction of one spring ribbon 10 is in a direction opposite to that of the other spring ribbon 10a. Specifically, the two constant torque spring ribbons 10 and 10a (Negator springs), having a set or bias, are wound in their bias sense around supply rolls 9 and 9a, and counter their bias sense around the spring working rolls 8 and 8a in S-like configuration. Spring working roll 8 is mounted coaxially onto tape reel 3, and working roll 8a is mounted coaxially onto tape reel 3a. As the biased spring ribbons 10 and 10a tend to wind themselves back, in their bias sense, onto the supply rolls 9, 9a, a torque is generated by spring ribbon 10 at working roll 8, and by ribbon 10a at working roll 8a. According to the invention, the winding direction of spring ribbon 10 on rolls 8 and 9 is opposite to the winding direction of spring ribbon 10a on the spools 8a and 9a. Since the working roll 8 is part of tape reel 3, and working roll 8a part of the other tape reel 3a, the two reels 3, 3a tend to turn in counter direction, thereby imparting constant tape tension to tape 4. In conclusion, since the pre-bent springs 10 and 10a strive to roll back onto the respective supply rolls 9 and 9a, a torque occurs at the working rolls 8, 8a whereby the reels 3 strive to rotate in opposite directions. The result is that a continuous longitudinal tension is created in the magnetic tape 4.

At the beginning of the rewind operation, the spring bands 10, which are called roll springs, or Tensator, or Negator spring, are present almost entirely on the working rolls 8 and 8a. The spring mechanism is then wound. The magnetic tape 4 is wound entirely on one of the reels 3. When the magnetic tape is pulled off the full reel 3, it rewinds onto the other reel 3 which is still empty, due to the torque created by the spring differential according to FIG. 1. Since the empty reel 3a must rotate faster than the full reel 3, the spring differential according to FIG. 1 relaxes and the roll springs 10 gradually wind back onto their supply rolls 9. When the magnetic tape 4 is rewound half way, both reels 3 will, for an instant, rotate at the same speed, and the spring differential according to FIG. 1 is then almost completely exhausted. The roll springs 10 are then almost completely on the respective supply rolls 9. During the second half of the rewind operation, the winding conditions of the magnetic tape 4 on the reels 3 are reversed and also the conditions of the roll springs 10 are reversed. The latter are now wound back again onto their working rolls 8, until, with the magnetic tape 4 completely rewound, also the spring differential according to FIG. 1 is again fully wound. Thus it is possible to rewind in each of the two running directions as desired.

In the arrangement of the roll spring differential compensating drive according to the invention as illustrated in FIG. 1, more spring turns are available in the hollow hubs of the reels, and therefore a longer magnetic tape 4 can be rewound than in the other known proposals. The arrangement according to the invention, moreover, offers the important advantage that the roll springs 10 with their supply rolls 9 are mounted not in the reels 3 themselves, but on the plate support 7. Therefore they hardly contribute to the moment of inertia of the reels 3, and they cause no imbalance at the reels 3. Also, because of the lower moment of inertia, it is possible to achieve much shorter start/stop times without harmful energy impulses being transmitted to the magnetic tape 4. On starting, the support 7 with the supply rolls 9 and the roll springs 10 wound thereon follows the reels slowly, and when the operation is stopped abruptly, support 7 with supply rolls 9 and roll springs 10 can overswing gently.

One narrow side of the cartridge housing 1 is formed by the two pivotable gripping arms 6 and 6a, which, when the cartridge is closed, are pressed by the magnetic tape 4 kept under tension, against the roughened circumferential edge of the reels 3. In this way the cartridge is dynamically maintained closed, and the reels 3 are fixed by the gripping arms 6 against undesired rotation. The gripping arms 6 and 6a are pivotable in the respective slide-block openings 11 about the guide pins 12 of housing 1. Each of the gripping arms has depression 13 and 13a. When the cartridge is inserted into the apparatus, a hook 14, 14a, on the side of the apparatus, engages into the depression and in so doing, the hook lifts the gripping arms 6 in the slide-block guides 11, 12, together with the magnetic tape 4, which is kept under tension by the spring differential according to FIG. 1, so that the tape is lifted from the cartridge housing 1 and is placed into the tape guide in the apparatus.

According to the invention, the slide-block openings 11 are so shaped that the area they finally traverse during swivelling out, extends almost parallel to the contiguous side wall of the housing 1. Therefore in the pivoted-out state, each gripping arm is pulled back a short distance into the housing 1 by the tensioned magnetic tape 4 and is consequently rigidly locked with the housing 1. When the cartridge is retracted from the apparatus, hooks 14 push against the depressions 13 of the gripping arms 6, cause them to slide a short distance out of the housing 1, and thus cause unlocking. Thereafter the gripping arms 6 are swivelled back into the housing 1 by the tensioned magnetic tape 4. Conversely, the gripping arms 6, 6a exert through the depressions 13, 13a, pressure on the hook 14 of the apparatus, which causes the cartridge to be ejected backward out of the apparatus.

For manual opening of the cartridge, the gripping openings 22 are disposed in the housing. The gripping arms 6 may be engaged through the openings 22 and may be pivoted out of the cartridge by hand. In this state of operation, the cartridge may also be played on conventional spool-to-spool magnetic tape apparatuses.

To close the cartridge, the gripping arms 6, are easily pulled out of the housing 1 by hand. The locking is thus terminated and the gripping arms 6 pivot back into the cartridge automatically because of the longitudinal pull in the tensioned magnetic tape 4, and close again.

Openings 16 in the housing 1, slide-block openings 11, and the holding pin 17 serve the purpose of fixing the inserted cartridge in the apparatus. When the cartridge is closed, opening 16 is covered by the pivoted-in gripping arm 6. When the gripping arms 6 are swivelled out, the openings 16 and 11 lie one above the other open. When the cartridge is inserted, the holding pins 17 are so introduced into the cartridge through the hole pairs 11 and 16 that the holding pin 17, which according to the invention is made of electrically conductive material, is in contact lightly with one broad side of the tensioned magnetic tape 4. In this manner, on the one hand, the gripping arm 6, housing 1 and the apparatus are locked together, and on the other hand, the holding pin 17 serves to eliminate any existing disturbing electrostatic charge from the magnetic tape 4. Alternatively, the holding pin 17 may have a fork type shape so that it touches the magnetic tape 5 on the front and back sides, thus eliminating electrostatic charges from both sides.

Further, a drive roll 18 is arranged on the side of the apparatus so that, with the cartridge open, it can be pivoted against the roughened circumferential edge of one of the reels 3. Upon rotation of this drive roll by the tape drive on the side of the apparatus (not shown in the drawings), not only the directly driven reel 3 is set in rotation, but also the other reel 3 is entrained due to the spring differential of FIG. 1. Thus the magnetic tape 4 may be transferred from one reel 3 to the other reel 3a, and vice versa in both winding directions, by only driving one tape reel 3.

The gripping arms 6, 6a each has an edge, which is pressed by means of the tensioned tape 4 against the roughened rim of the reel 3, when the cartridge is closed, thereby locking the gripping arms 6 to the arrested reels 3.

The magnetic tape cartridge of the invention described hereinabove not only fulfills the objects but also greatly simplifies the construction of the respective apparatus because an additional reel drive mechanism is not necessary in the apparatus. Further, no additional spiral springs, as customary in known systems, are necessary in the cartridge for fetching back the pivoted-out flaps or for fixing the spools with the cartridge closed, because these functions are all carried out by the magnetic tape 4 which is kept under tension by the roll spring differential compensating drive of the invention according to FIG. 1. This tape tension, as generated by means of the built-in constant torque spring differential of FIG. 1, is utilized for keeping the cartridge sealed, for locking the reels 3 in the closed cartridge, for locking the swivelled-out tape gripping arms 6, 6a of the open cartridge which also serve as shutters, and for retraction of tape 4 and the same gripping arms 6 into the ejected cartridge and for ejecting the cartridge itself out of the recorder. For performing these functions in most other known systems of this kind, additional springs or mechanisms have to be installed. This simplification of the cartridge results in low manufacturing and assembling cost.

In addition, the cartridge according to the invention offers the designer of the apparatus a great number of possibilities, in the construction of a variety of apparatuses for a great number of different applications, not only for magnetic tape, but for instance also for picture film, punch tape and typewriter ribbons.

What is claimed is:

1. A cartridge for at least one tape or filament type information carrier, for use with an apparatus for recordal or transmission, which comprises a housing, openings in the housing for access to the information carrier, flaps covering said openings, a shaft fastened to the housing, two reels rotating around said shaft, one reel being the supply reel and the other reel being a take-up reel, the information carrier being guided between said reels, at least two spring constant torque mechanisms respectively comprising a Negator spring coiled in a supply roll and a working roll counter to its inherent pre-curvature and extending between a supply roll and a working roll, the direction of twisting of each spring band being directed counter to that of the other spring band, each one of the working rolls belonging to each of said spring mechanisms being coaxially mounted onto each reel, and arranged in the hollow hub in each reel, said reels having oppositely directed torques which generate a spring differential compensating drive to hold the information carrier in tension and the supply rolls are mounted on a common support which is loosely rotatable with the working rolls and the reels about said shaft.

2. Cartridge according to claim 1, wherein at least one of the flaps is in the form of a gripping arm pivotable in said housing, said gripping arm having a depression engageable with a hook in said apparatus for pivoting the gripping arm with the tensioned information carrier out of the cartridge and during retraction of the cartridge from the apparatus pushing the gripping arm with the tensioned information carrier back into the housing, means for locking the pivoted-out gripping arm with the housing and for locking the inserted cartridge to the apparatus and means for locking the pivoted-in gripping arm with the reels.

3. A cartridge according to claim 2 wherein the gripping arm has an opening, the housing has a pin and the gripping arm is pivotable in said opening about said pin.

4. A cartridge according to claim 3 wherein during outward pivoting of said gripping arm, said opening finally extends almost parallel to a contiguous side wall of the housing, and then the pivoted-out gripping arm is adapted to travel a short path parallel to said side wall back into the housing whereby the pivoted-out gripping arm is locked to the housing.

5. The cartridge according to claim 4 wherein said housing has openings which are closed when the gripping arm is pivoted in and which, when the gripping arm is pivoted out, lie coinciding with the openings in said gripping arm and a pin provided in the apparatus which after insertion of the cartridge is introduced into said openings in the gripping arm and in the housing to lock the gripping arm to the housing and the cartridge to the apparatus.

6. A cartridge according to claim 5 wherein the pin is of electrically conductve material, and said openings in the housing and in the gripping arm are so arranged that the pin touches at least one broad side of the information carrier.

7. A cartridge according to claim 2 wherein at least one of the reels has a flange with roughened circumferential rim and the gripping arm has an edge, which with the gripping arm in pivoted-in position, is engaged in the roughened rim of the reel to arrest the reel inside the closed cartridge.

8. The cartridge according to claim 7 wherein the apparatus is provided with a drive roller which imparts rotation to the one reel which is directly driven and to the other reel via the information carrier and the spring mechanism, for winding the information carrier back and forth in both directions.

9. The cartridge according to claim 1 wherein each working roll of a spring mechanism is part of the reel.

* * * * *